US012631060B2

(12) United States Patent
Kakita

(10) Patent No.: US 12,631,060 B2
(45) Date of Patent: May 19, 2026

(54) VEHICLE DOOR OPENING AND CLOSING OPERATION DEVICE

(71) Applicant: ALPHA (GUANGZHOU) AUTOMOTIVEPARTS CO., LTD., Guangzhou City (CN)

(72) Inventor: Kosuke Kakita, Guangzhou City (CN)

(73) Assignee: ALPHA (GUANGZHOU) AUTOMOTIVEPARTS CO., LTD., Guangzhou City (CN)

( * ) Notice: Subject to any disclaimer, the term of this patent is extended or adjusted under 35 U.S.C. 154(b) by 203 days.

(21) Appl. No.: 18/480,196

(22) Filed: Oct. 3, 2023

(65) Prior Publication Data

US 2024/0125164 A1 Apr. 18, 2024

(30) Foreign Application Priority Data

Oct. 13, 2022 (CN) ......................... 202211253510.0

(51) Int. Cl.
*E05B 85/10* (2014.01)
*E05B 85/18* (2014.01)

(52) U.S. Cl.
CPC ............ *E05B 85/103* (2013.01); *E05B 85/18* (2013.01)

(58) Field of Classification Search
CPC ............................. E05B 85/103; E05B 85/107
See application file for complete search history.

(56) References Cited

U.S. PATENT DOCUMENTS 6,062,614 A * 5/2000 Petzold .................. E05B 85/14 292/DIG. 31
6,698,262 B2 * 3/2004 Wittwer .................. E05B 77/34 292/DIG. 31

(Continued)

FOREIGN PATENT DOCUMENTS

CN 107503598 A 12/2017
CN 110067464 A 7/2019

(Continued)

OTHER PUBLICATIONS

The extended European search report issued by the European Patent Office on Mar. 11, 2024, which corresponds to European Patent Application No. 23202744.1-1005 and is related to U.S. Appl. No. 18/480,196.

(Continued)

*Primary Examiner* — Carlos Lugo
(74) *Attorney, Agent, or Firm* — Studebaker Brackett PLLC

(57) ABSTRACT

A vehicle door opening and closing operation device includes a cover swing mechanism and a door opening and closing operation portion to be operated by a user. The cover swing mechanism has a cover member that moves between a closed position where an operation opening portion is closed and an open position where the operation opening portion is opened. The cover swing mechanism includes a swing link unit and a swing unit. The swing link unit is swingable and movably supports the cover member between the closed position and the opening position. The swing unit includes a cam member. The swing unit presses an engagement portion of the link unit by a protruding portion provided on the cam member and swings the link unit to move the cover member. At least a part of the engagement portion overlaps the cam member in a front view.

1 Claim, 18 Drawing Sheets

(56) References Cited

U.S. PATENT DOCUMENTS

| | | | | |
|---|---|---|---|---|
| 7,108,301 | B2 * | 9/2006 | Louvel | E05B 85/103 292/201 |
| 9,458,649 | B2 * | 10/2016 | Fujiwara | E05B 81/56 |
| 10,174,528 | B2 | 1/2019 | Velicanin | |
| 10,253,533 | B1 | 4/2019 | Pudney et al. | |
| 11,066,857 | B2 * | 7/2021 | Torkowski | E05B 79/06 |
| 11,821,245 | B2 * | 11/2023 | Herdering | E05B 81/76 |
| 2003/0019261 | A1 | 1/2003 | Wittwer | |
| 2007/0051046 | A1 | 3/2007 | Yoshida | |
| 2022/0213728 | A1 | 7/2022 | Ilardo et al. | |
| 2023/0258029 | A1 * | 8/2023 | Philippe | E05B 85/103 70/277 |

FOREIGN PATENT DOCUMENTS

| | | | | | |
|---|---|---|---|---|---|
| CN | 211342271 | U | | 8/2020 | |
| CN | 114715292 | A | | 7/2022 | |
| CN | 114776153 | A | * | 7/2022 | E05B 79/22 |
| CN | 115059362 | A | * | 9/2022 | E05B 85/107 |
| DE | 19847212 | A1 | * | 4/2000 | E05B 85/14 |
| DE | 102020132163 | B3 | * | 1/2022 | E05B 81/06 |
| EP | 2032782 | B1 | | 8/2010 | |
| JP | H08-082159 | A | | 3/1996 | |
| JP | 2007-070883 | A | | 3/2007 | |

OTHER PUBLICATIONS

An Office Action; mailed by the China National Intellectual Property Administration of the People's Republic of China on Jun. 4, 2025, which corresponds to Chinese Patent Application No. 202211253510.0 and is related to U.S. Appl. No. 18/480,196.

* cited by examiner

VEHICLE DOOR OPENING AND CLOSING OPERATION DEVICE

CROSS-REFERENCE TO RELATED APPLICATIONS

This application is based on and claims priority under 35 USC 119 from Chinese Patent Application No. 202211253510.0 filed on Oct. 13, 2022, the contents of which are incorporated herein by reference.

TECHNICAL FIELD

The present disclosure relates to a vehicle door opening and closing operation device.

BACKGROUND ART

US2003/0019261A1 discloses a door opening and closing operation device having a structure in which a handle member to be gripped by a user is projected and retracted when a door of a vehicle is opened and closed. In the door opening and closing operation device, a cam member whose distance from a rotation center is displaced depending on a rotation angle is brought into contact with the handle member, and the cam member is driven by a motor to project and retract the handle member.

In the above door opening and closing operation device, since the handle member is configured to abut on and be pressed by an outer periphery of the cam member, an outer shape of the cam member becomes larger according to a stroke amount of the handle member, and the size of the device is increased.

SUMMARY OF INVENTION

The present disclosure relates to a vehicle door opening and closing operation device in which space is saved by downsizing.

According to the present disclosure, a vehicle door opening and closing operation device includes a cover swing mechanism and a door opening and closing operation portion. The cover swing mechanism has a cover member that moves between a closed position where an operation opening portion provided in a door of a vehicle is closed and an open position where the operation opening portion is opened. The door opening and closing operation portion is disposed in the door and configured to be operated by a user through the operation opening portion to open and close the door. The cover swing mechanism includes a link unit and a swing unit. The link unit is swingable and movably supports the cover member between the closed position and the opening position. The swing unit includes a cam member configured to be rotated by a motor. The swing unit is configured to press an engagement portion of the link unit by a protruding portion provided on the cam member, and to swing the link unit to move the cover member. In the vehicle door opening and closing operation device, at least a part of the engagement portion overlaps the cam member in a front view.

According to the vehicle door opening and closing operation device, it is possible to save space by downsizing.

DESCRIPTION OF EMBODIMENTS

Hereinafter, exemplary embodiments will be described with reference to the drawings.

Figure 1:
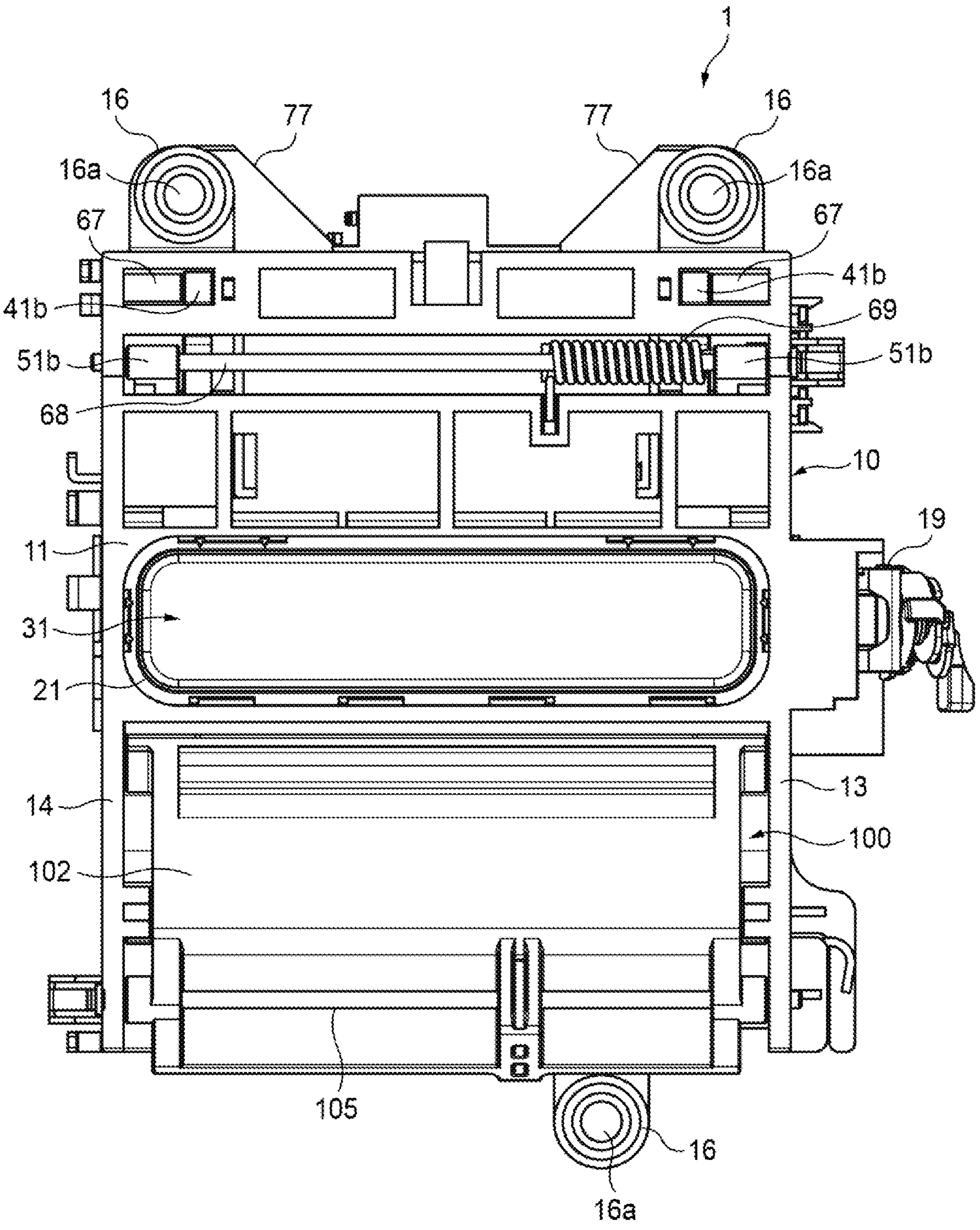
FIG. 1 is a front view of a vehicle door opening and closing operation device.
Figure 2:
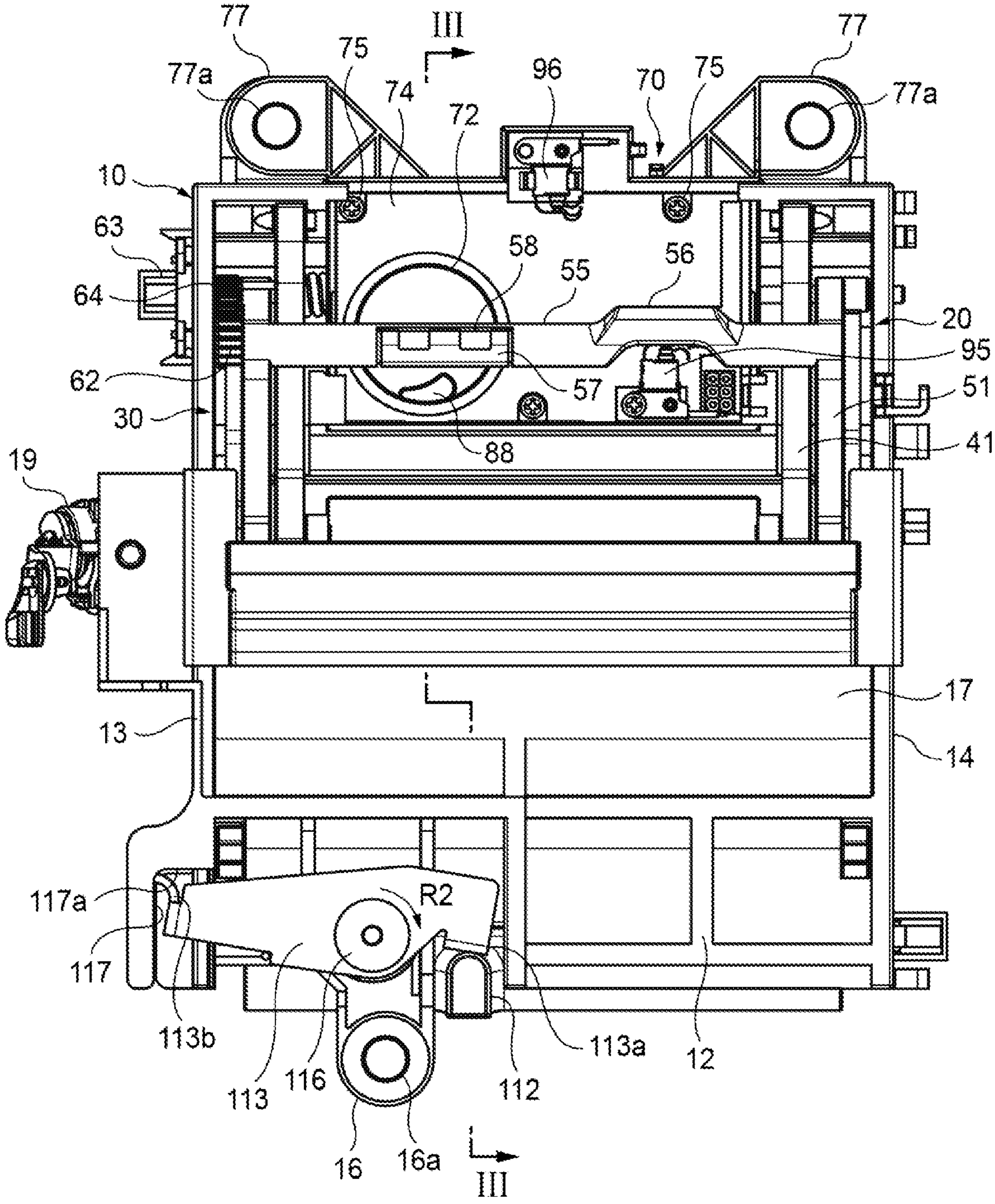
FIG. 2 is a back view of the vehicle door opening and closing operation device.
Figure 3:
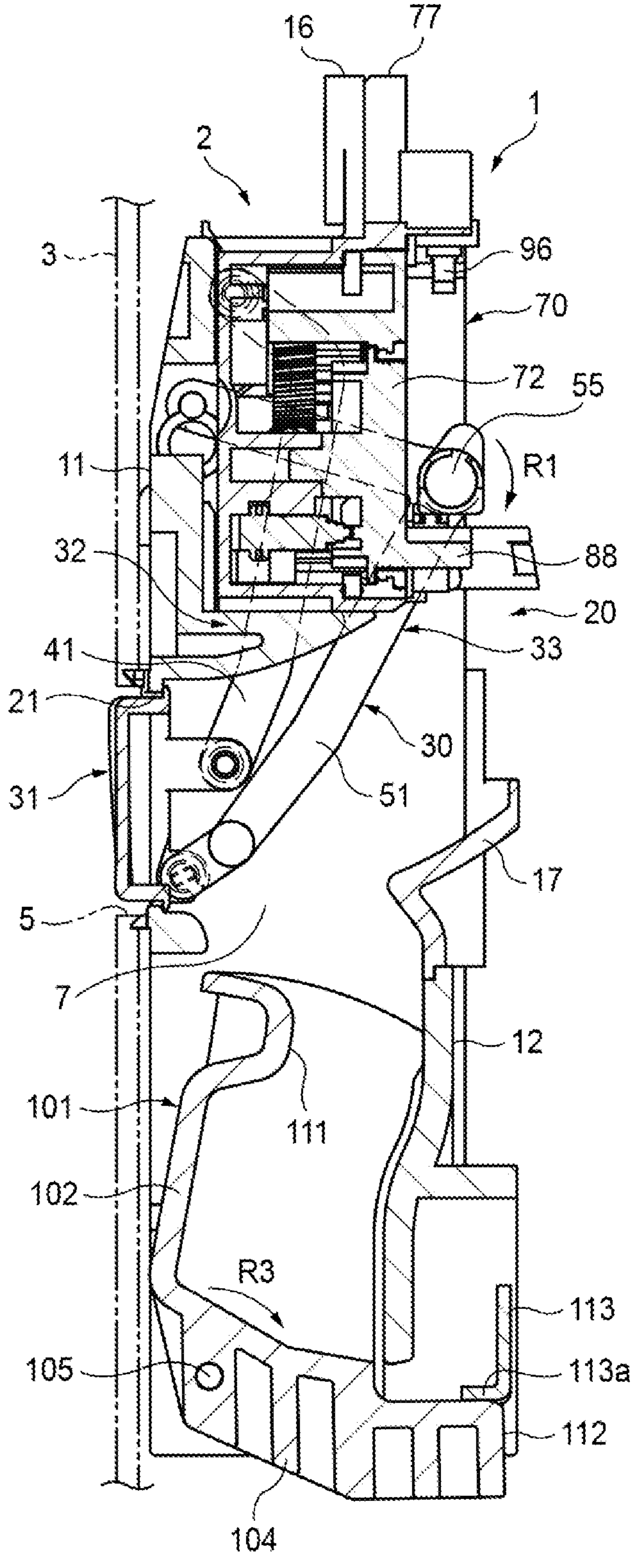
FIG. 3 is a cross-sectional view taken along a line in III-III FIG. 2.
Figure 4:
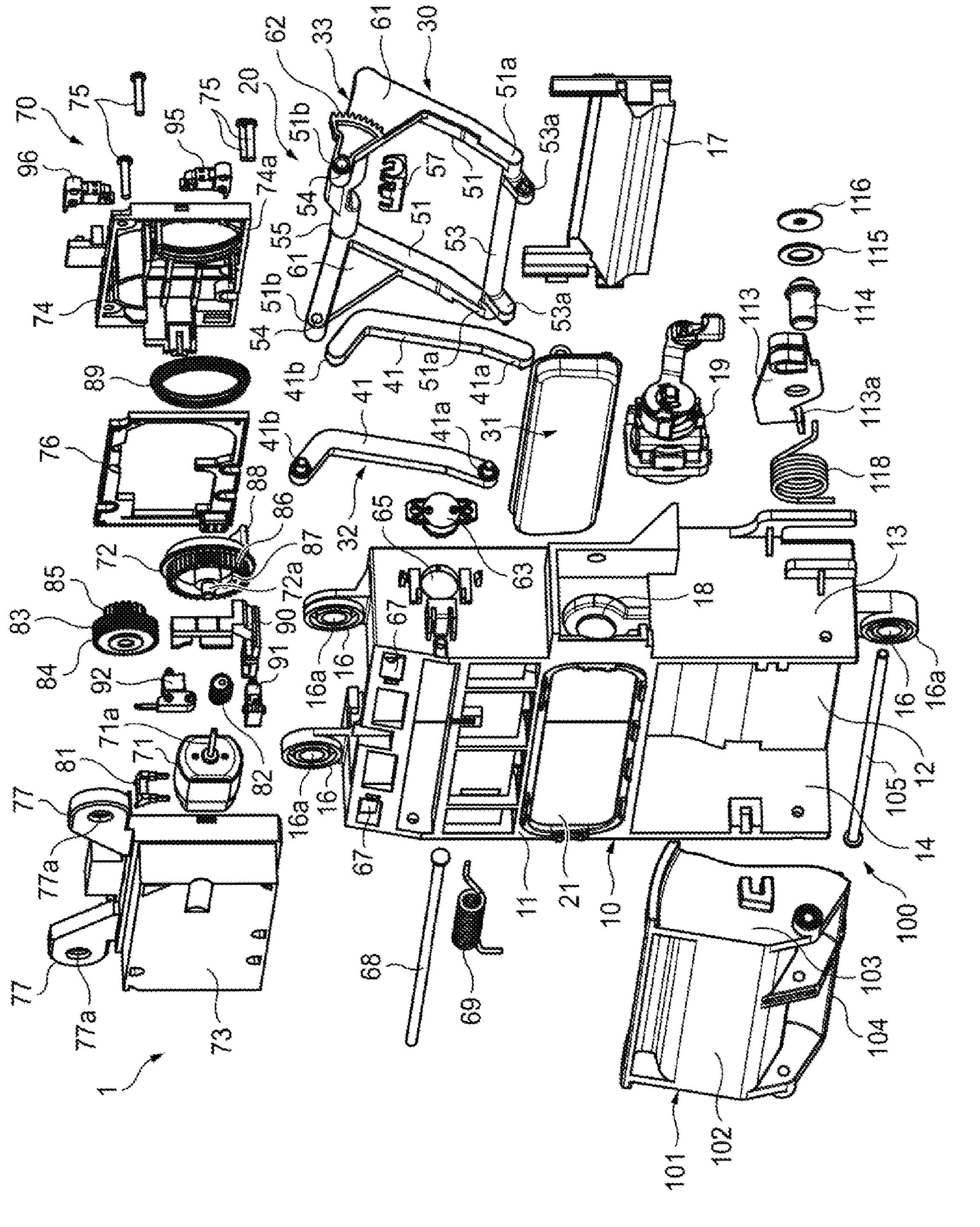
FIG. 4 is an exploded perspective view of the vehicle door opening and closing operation device.

FIG. 1 is a front view of a vehicle door opening and closing operation device according to an embodiment. FIG. 2 is a back view of the vehicle door opening and closing operation device. FIG. 3 is a cross-sectional view taken along a line III-III in FIG. 2. FIG. 4 is an exploded perspective view of the vehicle door opening and closing operation device.

As shown in FIGS. 1 to 4, a vehicle door opening and closing operation device 1 according to the present embodiment is provided in a door 2 of a vehicle such as an automobile. An operation opening portion 5 is formed in an outer panel 3 constituting the door 2 provided with the vehicle door opening and closing operation device 1, and a space inside the door 2 communicates with the outside through the operation opening portion 5.

The vehicle door opening and closing operation device 1 includes a cover swing mechanism 20 and a door opening and closing mechanism 100. The cover swing mechanism 20 and the door opening and closing mechanism 100 are accommodated in a case 10. The cover swing mechanism 20 is incorporated in an upper portion of the case 10, and the door opening and closing mechanism 100 is incorporated in a lower portion of the case 10. In the vehicle door opening and closing operation device 1, the cover swing mechanism 20 and the door opening and closing mechanism 100 are controlled by a controller (not shown).

The case 10 is formed in a box shape having a front surface portion 11, a rear surface portion 12, and side surface portions 13 and 14. Attachment portions 16 each having an insertion hole 16*a* are formed at an upper portion and a lower portion of the case 10. Two attachment portions 16 are provided at an upper end of the case 10, and one attachment portion 16 is provided at a lower end of the case 10. The vehicle door opening and closing operation device 1 is fixed to the outer panel 3 by screwing bolts (not shown) inserted into the insertion holes 16*a* of the attachment portions 16 into brackets (not shown) of the outer panel 3 to fasten the attachment portions 16.

The case 10 is opened on a rear side at the upper portion where the cover swing mechanism 20 is provided, and is opened on a front side at the lower portion where the door opening and closing mechanism 100 is provided. A rear cover 17 is assembled to an upper portion of the rear surface portion 12 provided at a rear portion of the case 10.

An opening portion 21 having substantially the same shape as the operation opening portion 5 of the outer panel 3 is formed in the front surface portion 11 of the case 10. The opening portion 21 is formed at a position communicating with the operation opening portion 5 of the outer panel 3 in a state in which the vehicle door opening and closing operation device 1 is fixed to the outer panel 3.

A mounting hole 18 is formed in the case 10 at a position adjacent to the operation opening portion 5 on one side surface portion 13, and a cylinder lock 19 is mounted in the mounting hole 18. In the vehicle door opening and closing operation device 1, by inserting a key (not shown) into the cylinder lock 19 from the operation opening portion 5 and operating the key, locking and unlocking of the door 2 with respect to a body (not shown) of the vehicle can be performed.

Figure 5:
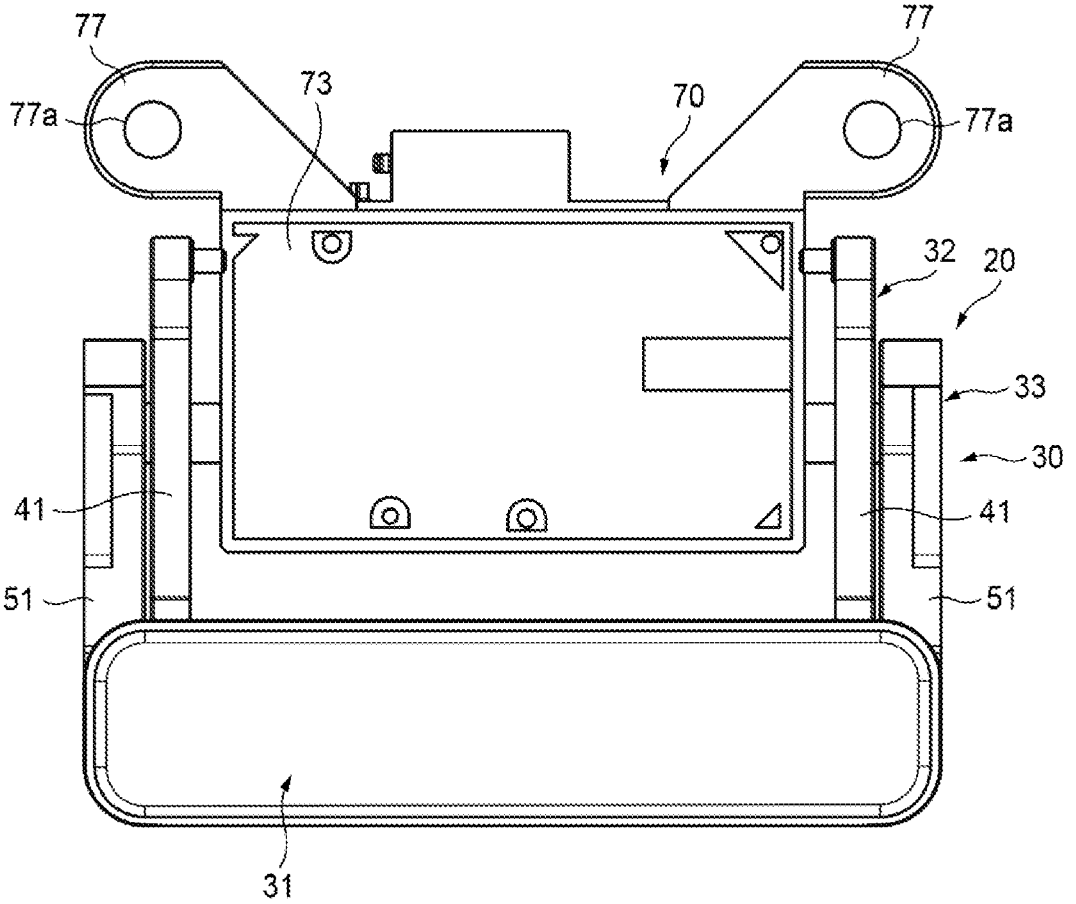
FIG. 5 is a front view of a cover swing mechanism.
Figure 6:
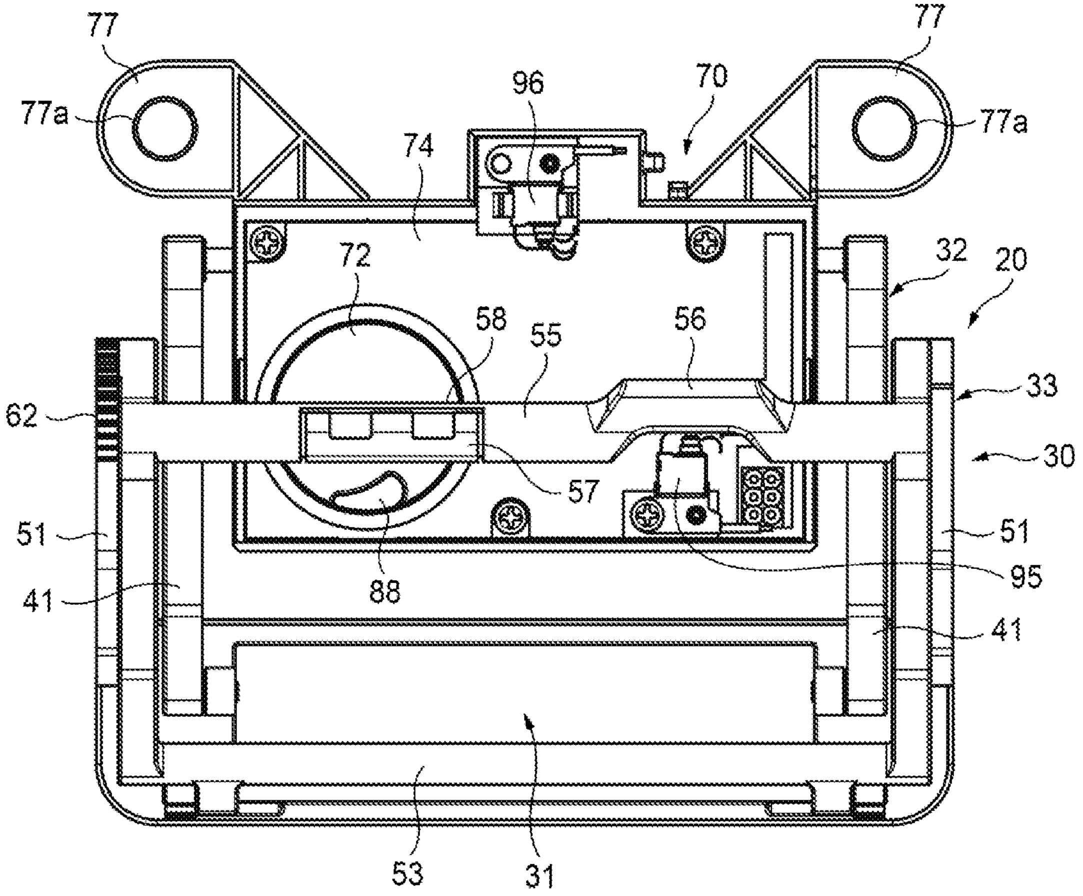
FIG. 6 is a back view of the cover swing mechanism.

FIG. 5 is a front view of the cover swing mechanism. FIG. 6 is a back view of the cover swing mechanism.

As shown in FIGS. 5 and 6, the cover swing mechanism 20 includes a link unit 30 and a swing unit 70. The link unit 30 and the swing unit 70 are accommodated in the upper portion of the case 10.

Figure 7:
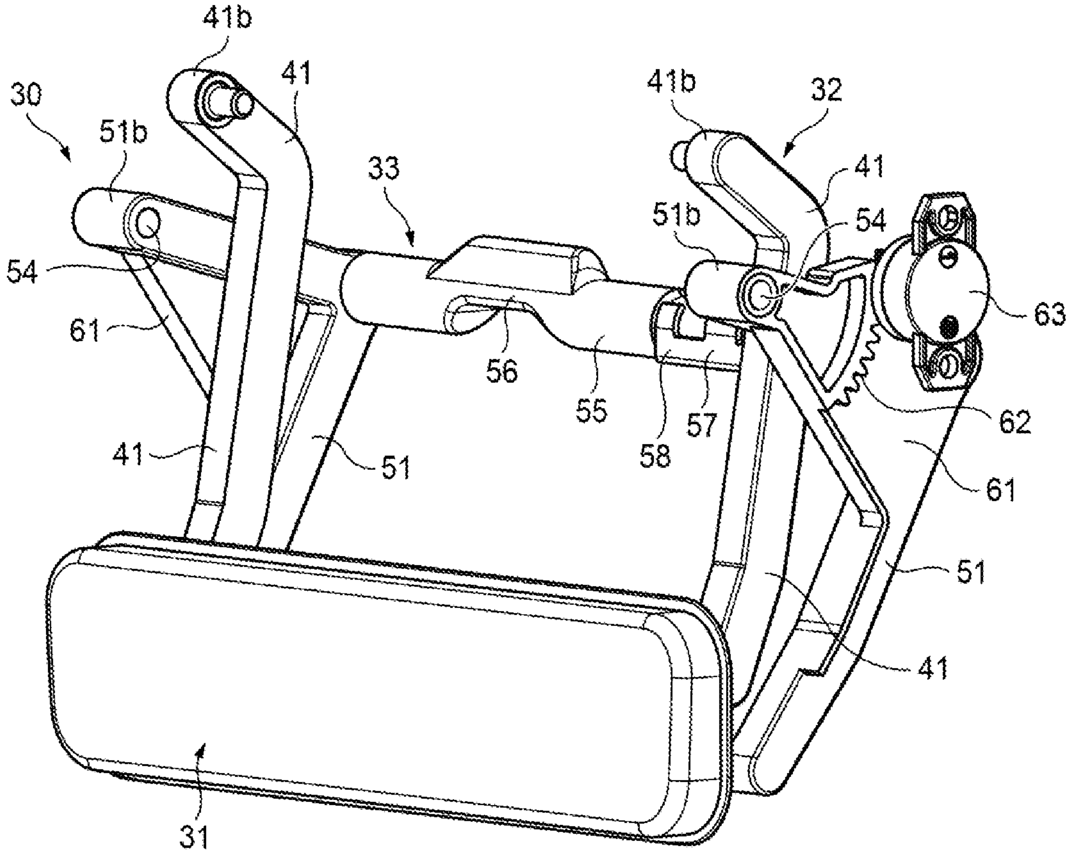
FIG. 7 is a perspective view of a link unit.
Figure 8:
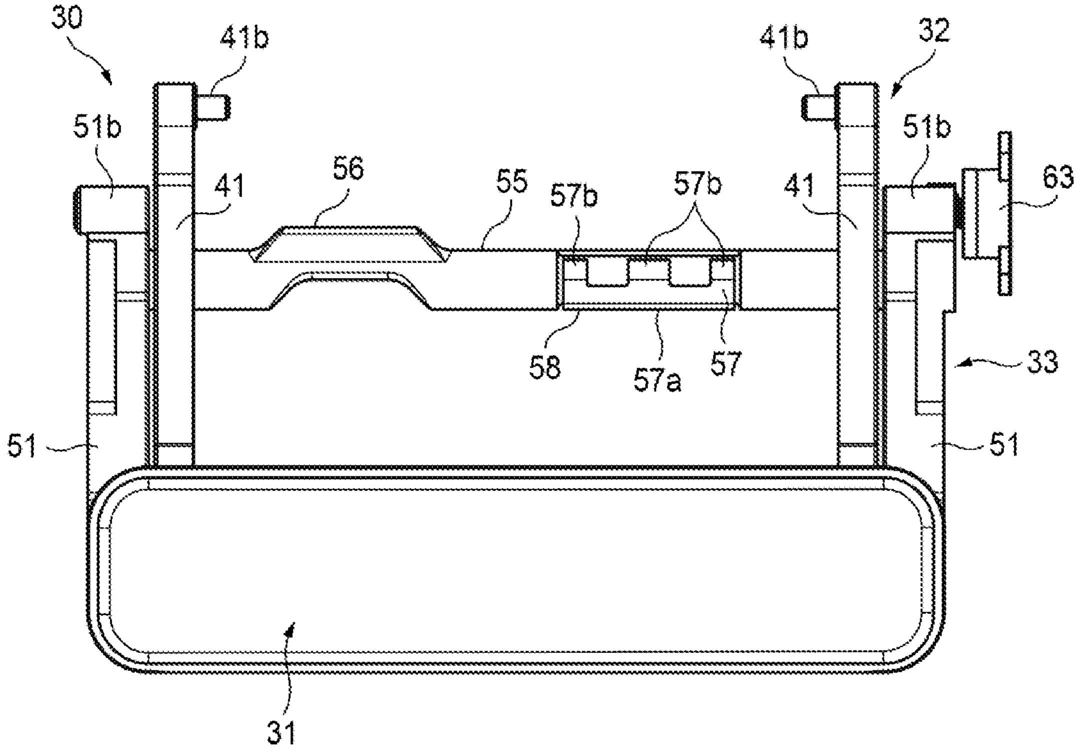
FIG. 8 is a front view of the link unit.
Figure 9:
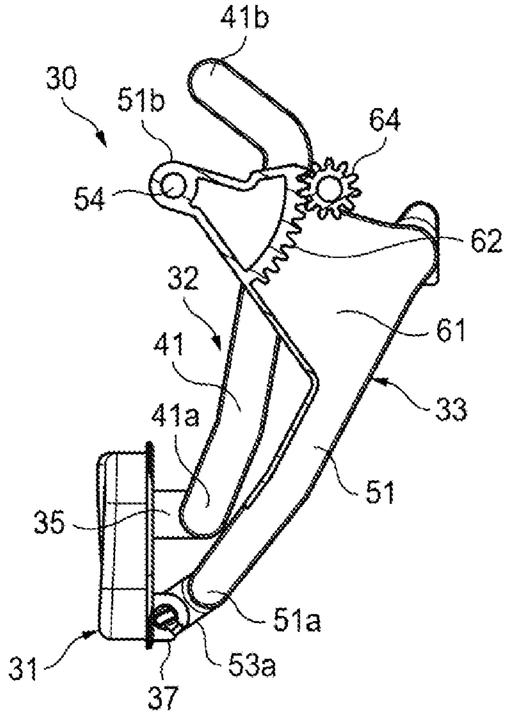
FIG. 9 is a side view of the link unit.

FIG. 7 is a perspective view of the link unit. FIG. 8 is a front view of the link unit. FIG. 9 is a side view of the link unit.

As shown in FIGS. 7 to 9, the link unit 30 includes a cover member 31, a first link portion 32, and a second link portion 33.

The cover member 31 is formed in a plate shape. The cover member 31 has an outer shape slightly smaller than the opening portion 21 formed in the front surface portion 11 of the case 10. A first coupling portion 35 and a second coupling portion 37 are formed in the vicinity of both ends on a rear surface of the cover member 31. The first coupling portion 35 is formed at an upper position of the rear surface of the cover member 31, and the second coupling portion 37 is formed at a position lower than the first coupling portion 35 on the rear surface of the cover member 31.

The first link portion 32 includes a pair of first link arms (link arms) 41. One end 41*a* of the first link arm 41 is rotatably coupled to the first coupling portion 35 of the cover member 31. The first link arm 41 is bent forward in the vicinity of the other end 41*b*.

The second link portion 33 includes a pair of second link arms (link arms) 51. The second link arm 51 is bent at a substantially right angle at an intermediate portion thereof. The second link arm 51 of the second link portion 33 is disposed outside the first link arm 41 of the first link portion 32.

One ends 51*a* of the second link arms 51 are coupled to each other via a coupling rod 53 (see FIG. 4). A pair of coupling pieces 53*a* are formed on the coupling rod 53, and the coupling pieces 53*a* are rotatably coupled to the second coupling portion 37 of the cover member 31. An insertion hole 54 is formed in the other end 51*b* of the second link arm 51.

The bent intermediate portions of the second link arms 51 are coupled to each other by a cam rod 55. The cam rod 55 has a crank portion 56 formed in a crank shape and a cam follower portion (engagement portion) 58 to which a bush 57 is attached. The bush 57 is formed of, for example, a resin material, and has a shape in which a plurality of claw portions 57*b* are erected from both edge portions of a flat plate portion 57*a*. The bush 57 is attached to the cam rod 55 by the claw portions 57*b* erected from both edge portions of the flat plate portion 57*a* gripping the cam rod 55. Accordingly, the cam follower portion 58 to which the bush 57 is attached is formed in the cam rod 55.

The second link arms 51 are each formed with a plate-shaped portion 61 at a bent position at an intermediate portion, and the second link arm 51 is reinforced from the intermediate portion to the other end 51*b* by the plate-shaped portion 61. A fan-shaped gear portion 62 is formed on an outer surface side of one plate-shaped portion 61 of the second link arms 51. A gear 64 of a damper 63 attached to a mounting hole 65 (see FIG. 4) of the side surface portion 13 of the case 10 meshes with the gear portion 62.

As shown in FIGS. 1 and 4, the other ends 41*b* of the first link arms 41 constituting the first link portion 32 of the link unit 30 are inserted from the inside of the case 10, and are rotatably supported by support recessed portions 67 formed in the vicinity of both side portions on the upper portion of the front surface portion 11 of the case 10.

In the second link arms 51 constituting the second link portion 33 of the link unit 30, a support rod 68 attached to the front surface portion 11 of the case 10 is inserted into and rotatably supported by the insertion holes 54 formed in the other ends 51*b* of the second link arms 51. The second link portion 33 is biased in one direction (R1 direction in FIG. 3) of a rotation direction by a coil spring 69 assembled to the support rod 68.

In the link unit 30, the first link portion 32 and the second link portion 33 supporting the cover member 31 constitute a parallel link. That is, the first link arm 41 of the first link portion 32 and the second link arm 51 of the second link portion 33 are rotated about the other ends 41*b* and 51*b*, respectively, as fulcrums, so that the cover member 31 is moved while maintaining substantially the same posture.

Figure 10:
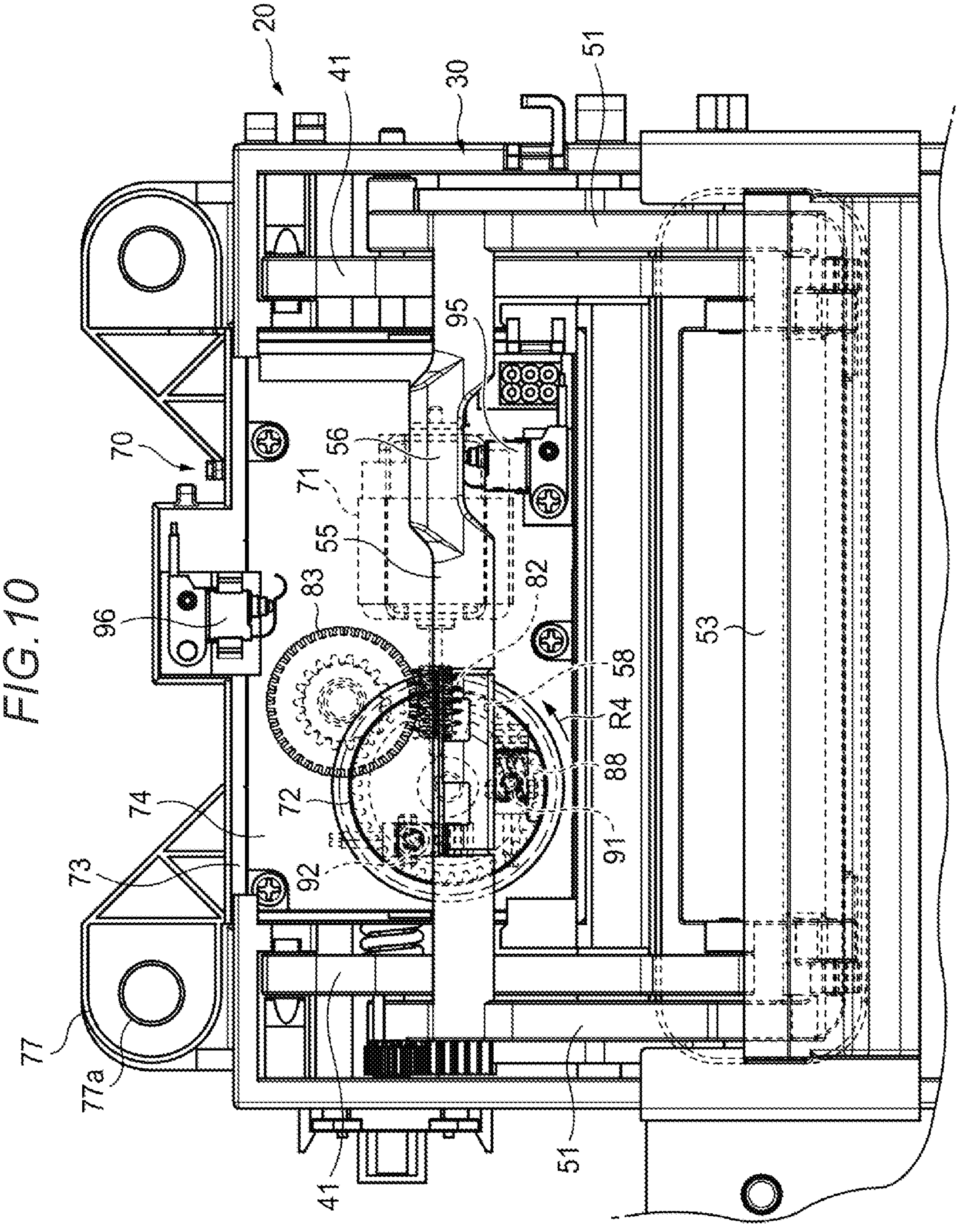
FIG. 10 is a back view of the cover swing mechanism of the vehicle door opening and closing operation device.
Figure 11:
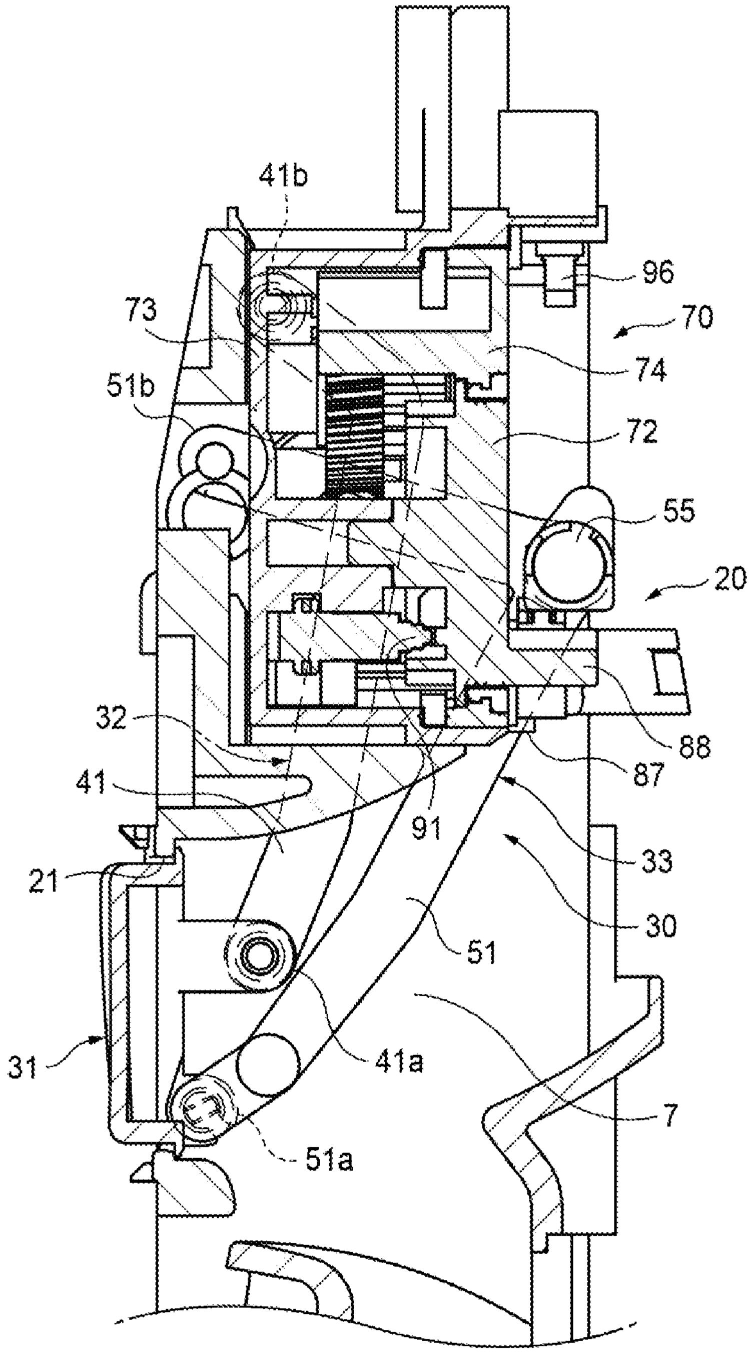
FIG. 11 is a cross-sectional view of the cover swing mechanism of the vehicle door opening and closing operation device.

FIG. 10 is a back view of the cover swing mechanism of the vehicle door opening and closing operation device. FIG. 11 is a cross-sectional view of the cover swing mechanism of the vehicle door opening and closing operation device.

As shown in FIGS. 4, 10, and 11, the swing unit 70 has a box-shaped accommodation case 73 whose rear surface side is opened, and a motor 71 and a cam member 72 are accommodated inside the accommodation case 73. A lid member 74 is screwed to the opened rear surface side of the accommodation case 73 by screws 75. A seal member 76 is provided between the accommodation case 73 and the lid member 74, and the seal member 76 seals a gap between the accommodation case 73 and the lid member 74.

Two attachment portions 77 each having an insertion hole 77*a* are formed on an upper portion of the accommodation case 73. In a state in which the swing unit 70 is accommodated in the case 10, the attachment portion 77 of the accommodation case 73 overlaps the attachment portion 16 of the case 10, and the insertion holes 16*a* communicate with the insertion holes 77*a*, respectively. In this state, bolts (not shown) inserted into the insertion holes 16*a* and 77*a* that communicate with each other are screwed into brackets (not shown) of the outer panel 3, and thus the attachment portions 16 and 77 are fastened and fixed to the brackets of the outer panel 3 together.

The motor 71 accommodated in the accommodation case 73 is driven by electric power supplied via a power supply electric wire (not shown) coupled to an electrode terminal 81. The motor 71 is disposed in the accommodation case 73 such that a drive shaft 71*a* thereof is directed laterally. The motor 71 is provided with a worm gear 82 on the drive shaft 71*a*.

In the accommodation case 73, a reduction-transmission gear 83 is supported between the motor 71 and the cam member 72 in a way of being rotatable about an axis extending in a front-rear direction. The reduction-transmission gear 83 includes a large-diameter gear 84 and a small-diameter gear 85, and the worm gear 82 of the motor 71 meshes with the large-diameter gear 84 of the reduction-transmission gear 83.

The cam member 72 is formed in a disk shape, and is supported inside the accommodation case 73 in a way of being rotatable about a rotation shaft 72*a* along the front-rear direction. The cam member 72 has an annular gear portion 86 on a front surface side thereof, and the small-diameter gear 85 of the reduction-transmission gear 83 meshes with the annular gear portion 86.

A switch operation protrusion 87 protruding forward is formed inside the annular gear portion 86 on the front surface side of the cam member 72. A cam protrusion (protruding portion) 88 protruding rearward is formed on a rear surface side of the cam member 72. The switch operation protrusion 87 and the cam protrusion 88 are disposed inside the outer shape of the cam member 72, and are each formed in an arc shape around the rotation shaft 72*a*. A circular window portion 74*a* is formed in the lid member 74 assembled to the accommodation case 73, and the rear surface side of the cam member 72 having the cam protrusion 88 is fitted into the window portion 74*a*. A gap between the window portion 74*a* and the cam member 72 is sealed by an annular seal member 89.

The cam protrusion 88 of the cam member 72 is disposed at a position below the cam follower portion 58 to which the bush 57 of the cam rod 55 of the second link portion 33 constituting the link unit 30 is attached, and presses the cam follower portion 58 upward as the cam member 72 rotates. That is, the cam follower portion 58 is pressed by the cam protrusion 88 of the cam member 72.

Two stop switches 91 and 92 are provided inside the accommodation case 73. The stop switches 91 and 92 are supported by the support member 90 at different positions around the rotation shaft 72*a* on a front side of the cam member 72. The stop switches 91 and 92 are turned on or off when the switch operation protrusion 87 of the cam member 72 is brought into contact with or separated from the stop switches 91 and 92.

The swing unit 70 includes two detection switches 95 and 96 on the rear surface side thereof. The detection switches 95 and 96 are attached to the lid member 74 assembled to the accommodation case 73. The detection switch 95 is disposed at a lower portion of the swing unit 70, and the detection switch 96 is disposed at an upper portion of the swing unit 70. The detection switches 95 and 96 are turned on or off when the cam rod 55 of the second link portion 33 constituting the link unit 30 is brought into contact with or separated from the detection switches 95 and 96.

In the cover swing mechanism 20 including the link unit 30 and the swing unit 70, the cam follower portion 58 of the cam rod 55 is disposed at a position overlapping the cam member 72 in a front view of the vehicle door opening and closing operation device 1. The swing unit 70 is disposed between the pair of first link arms 41 and between the pair of second link arms 51 constituting the first link portion 32 and the second link portion 33 of the link unit 30.

As shown in FIGS. 1, 3, and 4, the door opening and closing mechanism 100 includes an operation lever 101. The operation lever 101 includes a front plate portion 102, side plate portions 103, and a bottom portion 104. The operation lever 101 is accommodated in a lower portion of the case 10, the front side of which is opened. The front side of the bottom portion 104 of the operation lever 101 is rotatably supported by a support shaft 105 with respect to the case 10.

The operation lever 101 has a locking protruding portion 111 protruding inward in the vicinity of an upper edge of the front plate portion 102. Further, the operation lever 101 has a protruding portion 112 protruding rearward on the bottom portion 104, and the protruding portion 112 protrudes toward a rear side of the rear surface portion 12 of the case 10.

A pressing lever 113 is provided on the rear surface portion 12 of the case 10. The pressing lever 113 is rotatably attached to the rear surface portion 12 of the case 10 by a shaft member 114, a washer 115, and a crimping member 116. A pressing piece 113*a* that comes into contact with an upper portion of the protruding portion 112 of the operation lever 101 is formed on one end side of the pressing lever 113. A recessed portion 117 is formed in the rear surface portion 12 of the case 10. The recessed portion 117 is formed such that the other end portion 113*b* of the pressing lever 113 does not come into contact with the inner wall surface 117*a* of the recessed portion 117 and the rotation is not restricted when the pressing lever 113 is rotated (see FIG. 2).

The pressing lever 113 is biased in one direction (R2 direction in FIG. 2) by an elastic force of a coil spring 118 attached to the shaft member 114. Accordingly, the protruding portion 112 of the operation lever 101 is pressed down by the pressing piece 113*a* of the pressing lever 113. Accordingly, the operation lever 101 is biased in one direction (R3 direction in FIG. 3) toward a back side of the case 10 around the support shaft 105.

In the door opening and closing mechanism 100, the operation lever 101 is swung in a direction opposite to a biasing direction (R3 direction in FIG. 3) by the user inserting a finger into the operation opening portion 5 of the outer panel 3 and the opening portion 21 of the case 10, hooking the finger on the locking protruding portion 111, and pulling the locking protruding portion 111 toward a near side. Accordingly, the door 2 is opened with respect to the body (not shown) of the vehicle. The door 2 may be mechanically opened by an operation force of the operation lever 101, or may be opened by a drive unit that is driven by detecting the operation of the operation lever 101.

Next, the operation of the cover swing mechanism 20 will be described.

FIGS. 12 to 18 are views illustrating the movement of the cover swing mechanism.

Figure 12:
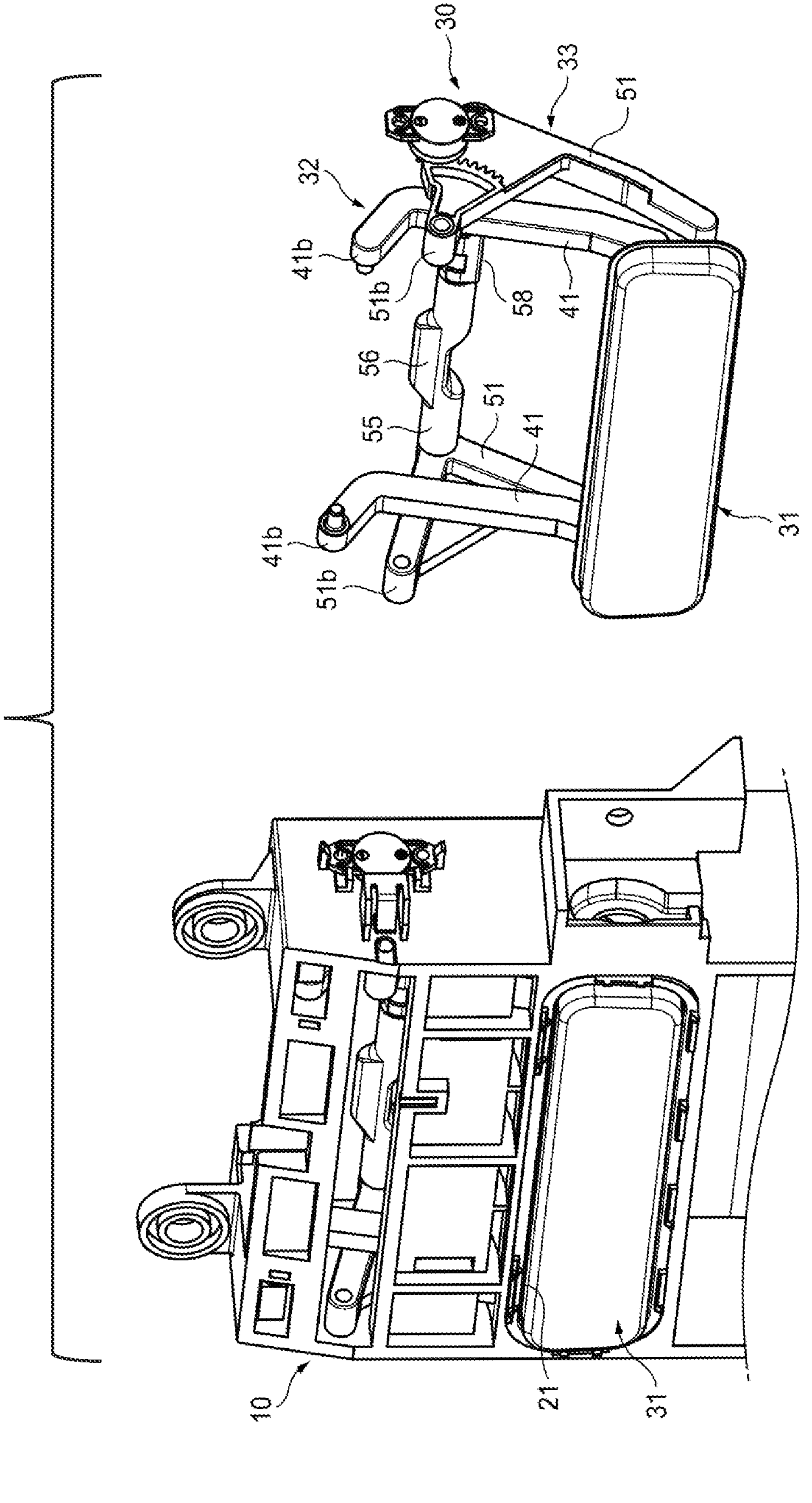
FIG. 12 is a perspective view of a part of the vehicle door opening and closing operation device in a closed state for illustrating movement of the cover swing mechanism and a perspective view of the link unit.

As shown in FIGS. 11 and 12, in the cover swing mechanism 20, in the closed state, the cover member 31 of the link unit 30 is fitted into the opening portion 21 of the case 10, and the operation opening portion 5 of the outer panel 3 of the door 2 is in a state of being closed by the cover member 31. As shown in FIG. 10, in the closed state, the crank portion 56 of the cam rod 55 constituting the second link portion 33 of the link unit 30 comes into contact with the detection switch 95, and the detection switch 95 is set to an ON state.

In this closed state, the user who opens the door 2 of the vehicle and gets on the vehicle pushes the cover member 31 of the link unit 30 with a finger. When the cover member 31 is pushed by the user, the cover member 31 is displaced toward an operation space 7 in the door 2 against the biasing force of the coil spring 69. Thus, the first link portion 32 and the second link portion 33 of the link unit 30 are swung against the biasing force of the coil spring 69, and the crank portion 56 of the cam rod 55 of the second link portion 33 is separated from the detection switch 95, and the detection switch 95 is in the OFF state. Then, the controller performs authentication based on, for example, an authentication code from an electronic key possessed by the user. When the authentication is established, the controller unlocks the lock mechanism of the door 2 with respect to the body of the vehicle and drives the swing unit 70.

In the swing unit 70, the motor 71 is driven, and the rotation of the motor 71 is decelerated by the reduction-transmission gear 83 and transmitted to the cam member 72. Accordingly, the cam member 72 rotates in one direction (direction R4 in FIG. 10). Thus, as the cam member 72 rotates, the cam protrusion 88 of the cam member 72 disposed at a lower side rotates upward while being in contact with the cam follower portion 58 of the cam rod 55.

Figure 13:
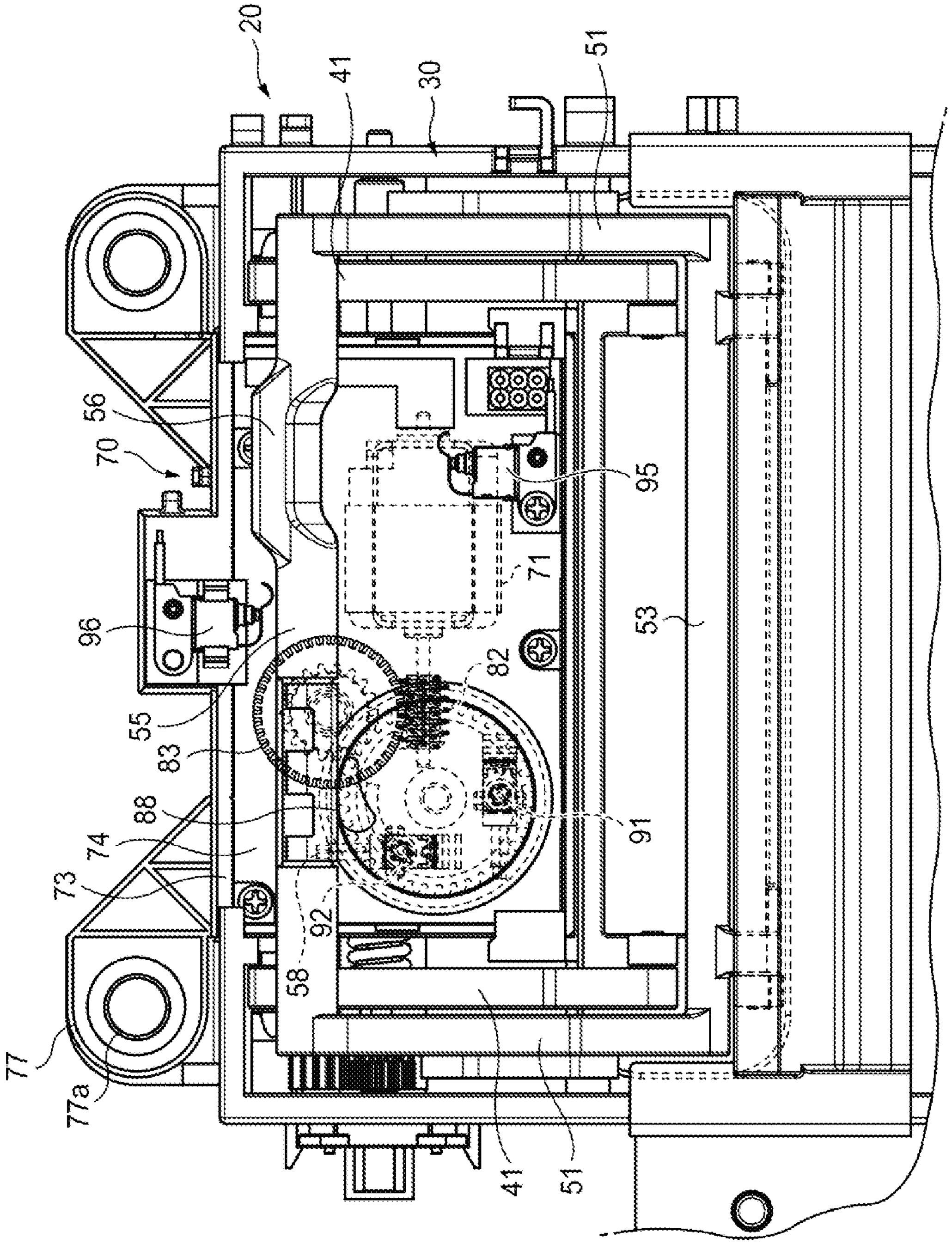
FIG. 13 is a back view of the cover swing mechanism of the vehicle door opening and closing operation device in an open state for illustrating the movement of the cover swing mechanism.
Figure 14:
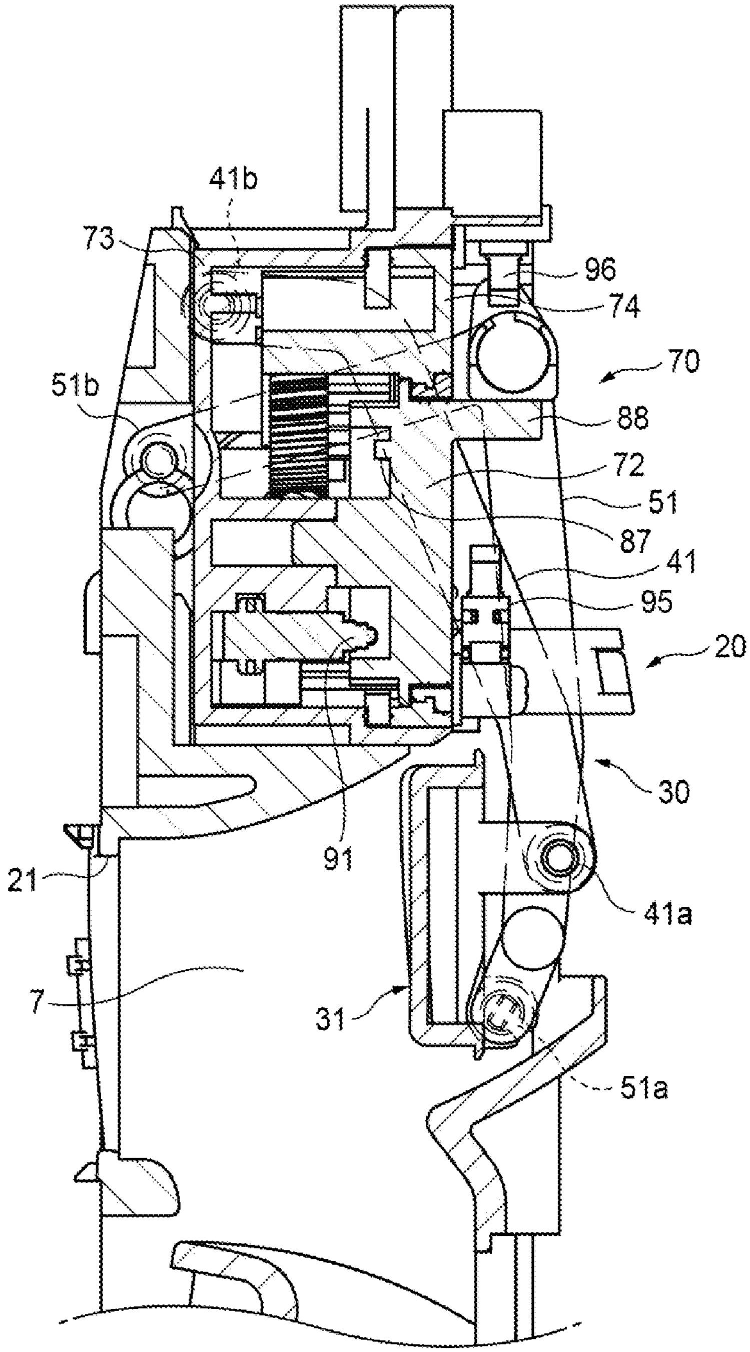
FIG. 14 is a cross-sectional view of the cover swing mechanism of the vehicle door opening and closing operation device in the open state for illustrating the movement of the cover swing mechanism.
Figure 15:
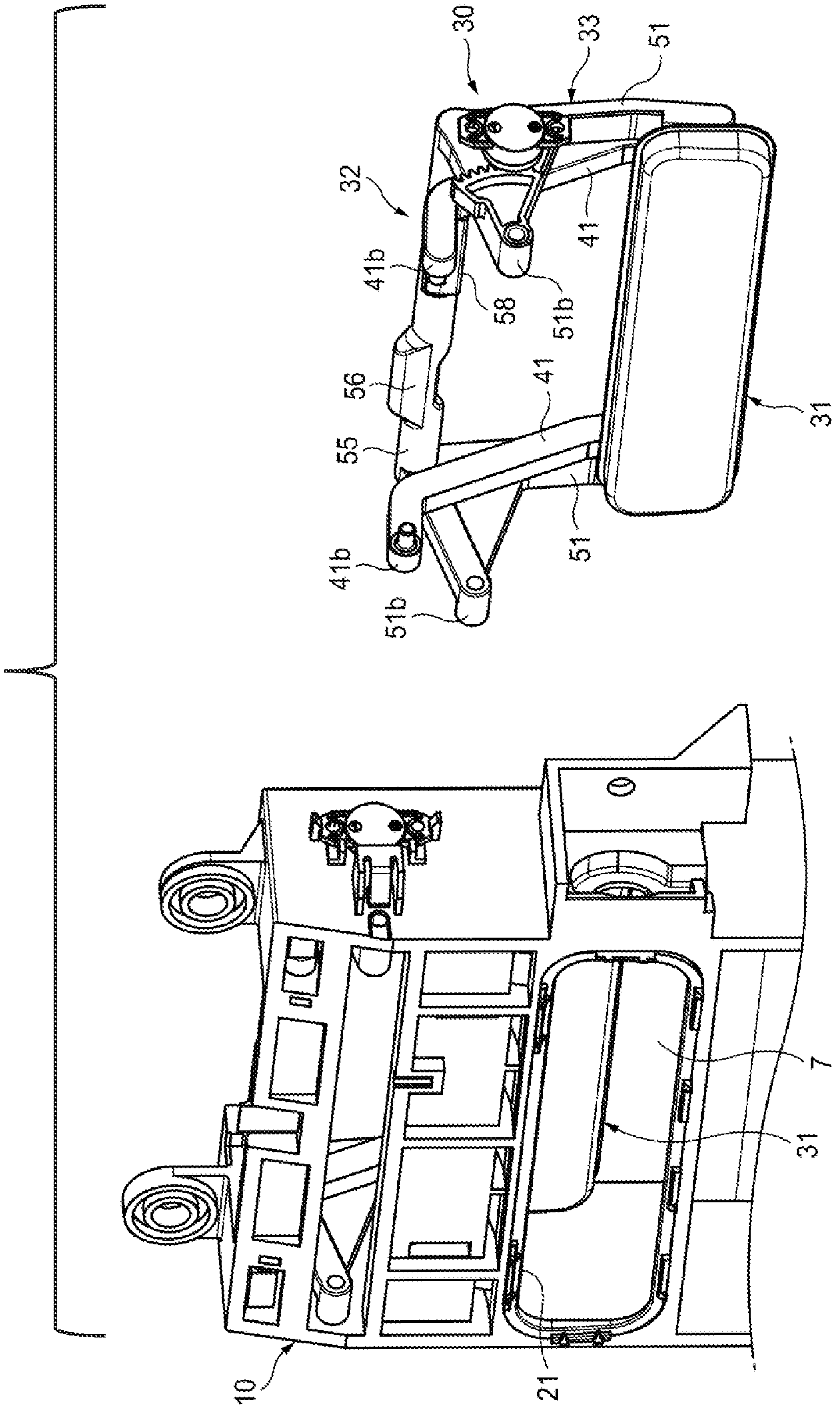
FIG. 15 is a perspective view of the part of the vehicle door opening and closing operation device in the open state for illustrating the movement of the cover swing mechanism and a perspective view of the link unit.

As shown in FIG. 13, when the cam protrusion 88 of the cam member 72 rotates upward, the cam rod 55 is pushed up. Accordingly, as shown in FIGS. 14 and 15, the first link portion 32 and the second link portion 33 constituting the parallel link of the link unit 30 swing, and the cover member 31 is moved into the operation space 7 while maintaining the posture. Accordingly, an open state is set in which the opening portion 21 of the case 10 and the operation opening portion 5 of the outer panel 3 are open.

In the open state, the switch operation protrusion 87 of the cam member 72 comes into contact with the stop switch 92, and the stop switch 92 is in the ON state. Thus, the driving of the motor 71 is stopped, the swinging of the link unit 30 is stopped, and the cover member 31 is maintained at the state of being disposed at the position in the open state.

In this open state, the user inserts his/her finger into the operation opening portion 5 of the outer panel 3 and the opening portion 21 of the case 10, puts his/her finger on the locking protruding portion 111 of the operation lever 101 of the door opening and closing mechanism 100, and pulls the operation lever 101 toward a near side. Accordingly, the door 2 is opened with respect to the body of the vehicle.

Figure 16:
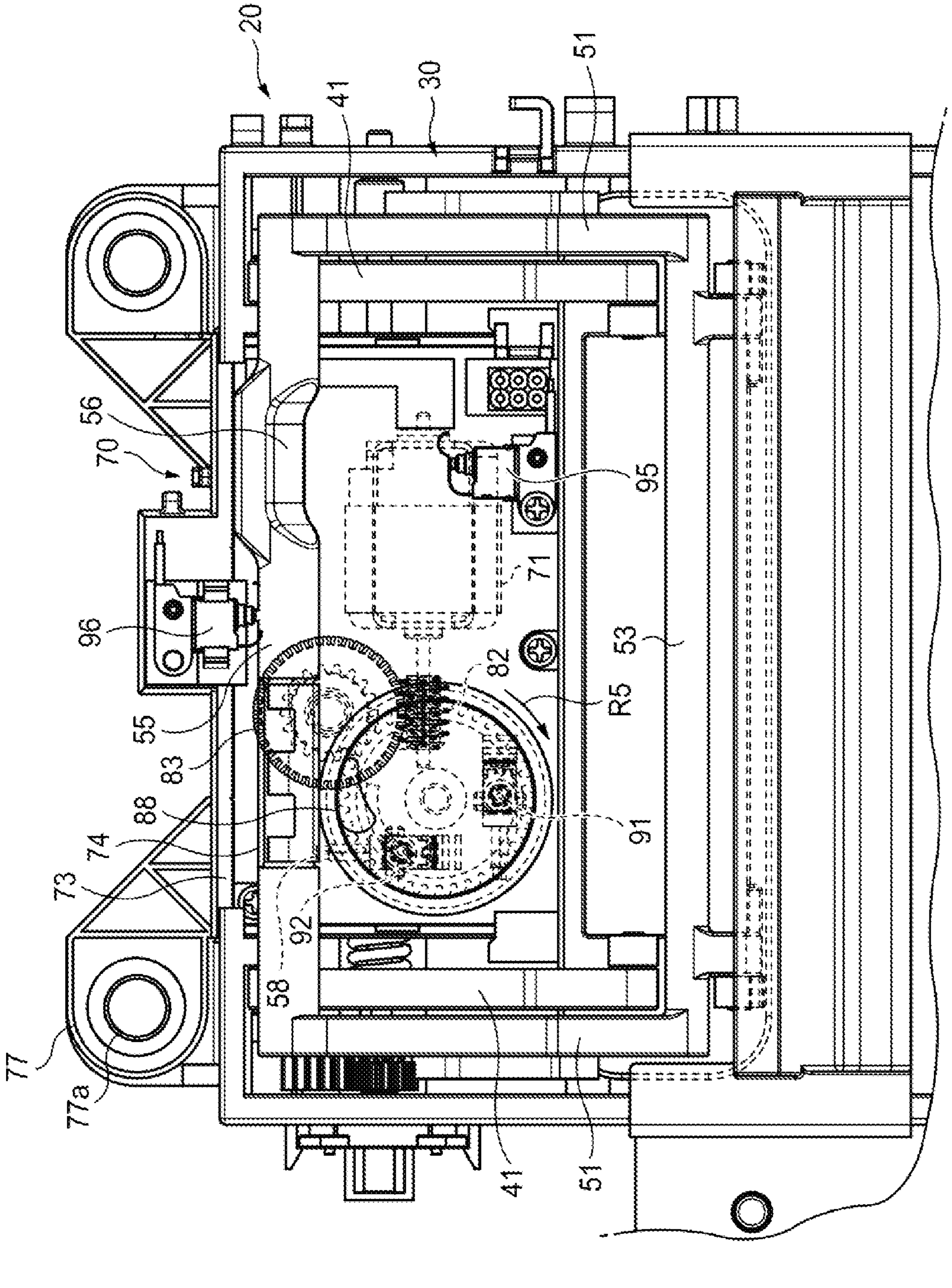
FIG. 16 is a back view of the cover swing mechanism of the vehicle door opening and closing operation device in a fully open state for illustrating the movement of the cover swing mechanism.
Figure 17:
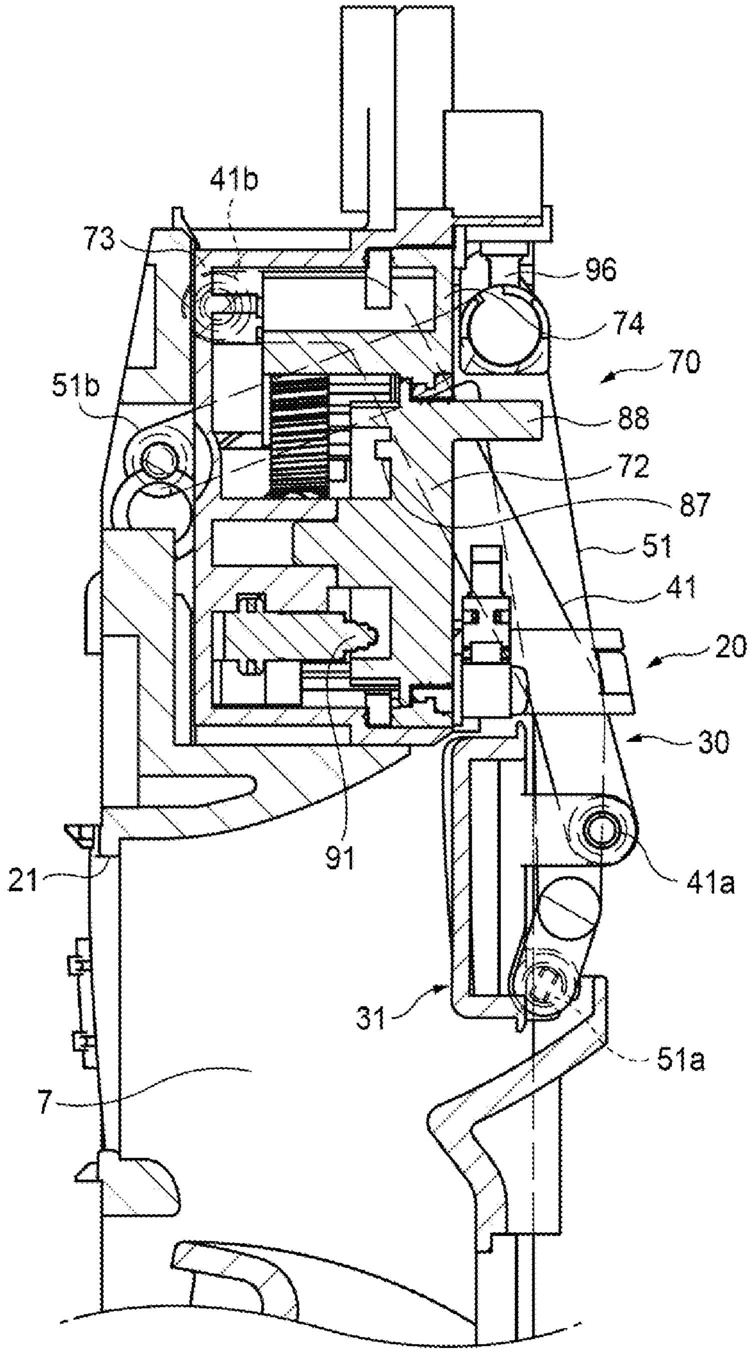
FIG. 17 is a cross-sectional view of the cover swing mechanism of the vehicle door opening and closing operation device in the fully open state for illustrating the movement of the cover swing mechanism.
Figure 18:
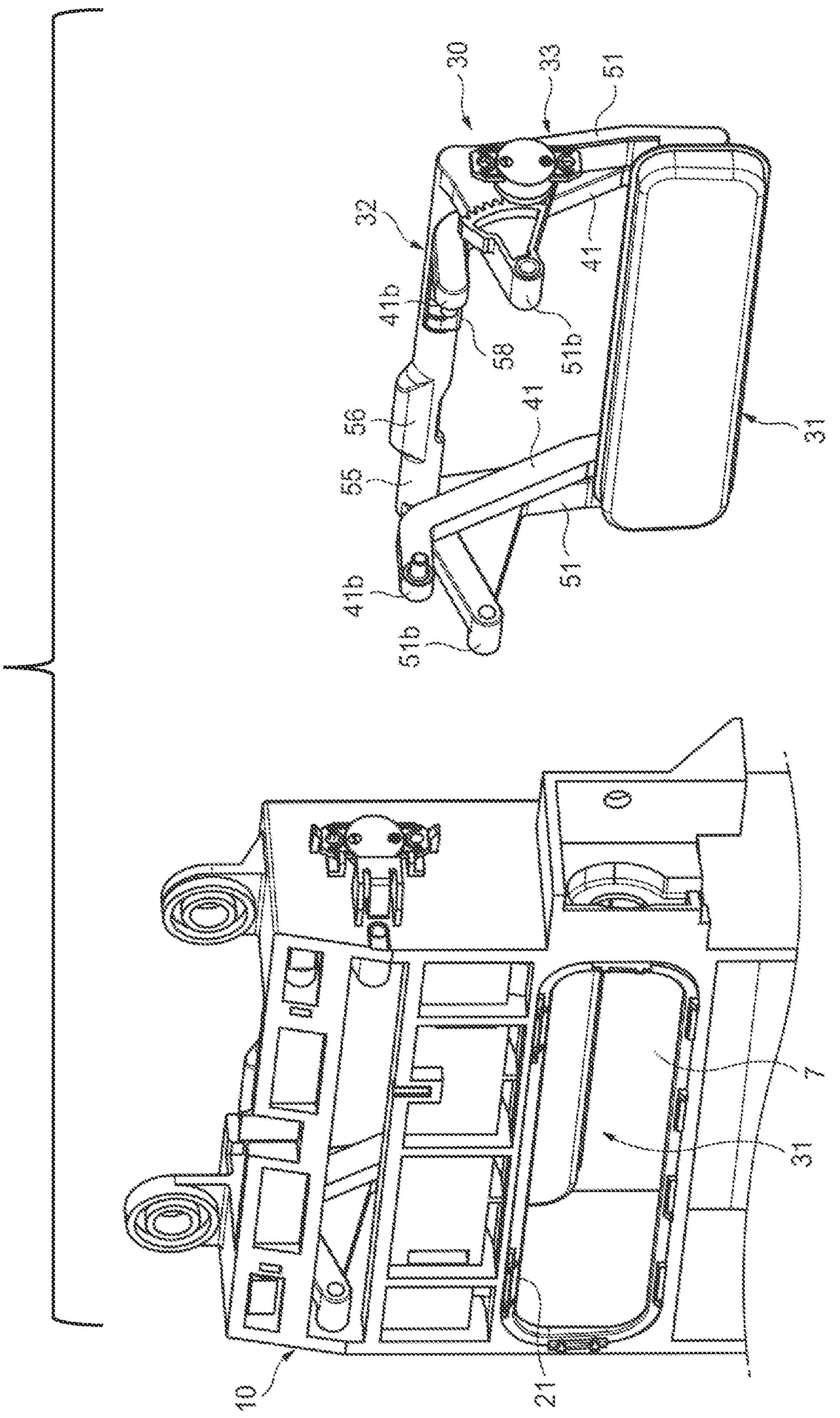
FIG. 18 is a perspective view of the part of the vehicle door opening and closing operation device in the fully open state for illustrating the movement of the cover swing mechanism and a perspective view of the link unit.

In this open state, when the user presses the cover member 31 of the link unit 30 in the open state with a finger, as shown in FIGS. 16 and 17, the cover member 31 is brought into a fully open state in which the cover member 31 is pushed inward, and the cam rod 55 constituting the second link portion 33 of the link unit 30 comes into contact with the detection switch 96. Accordingly, the detection switch 96 is set to the ON state.

When the detection switch 96 is set to the ON state, the motor 71 of the swing unit 70 is driven, and the cam member 72 rotates in an opposite direction (direction R5 in FIG. 16). Thus, the cam protrusion 88 of the cam member 72 disposed on the upper side rotates downward. When the cam protrusion 88 of the cam member 72 rotates downward, the cam rod 55 of the second link portion 33 biased by the coil spring 69 moves downward. Accordingly, the cover member 31 moves toward the opening portion 21 of the case 10 and the operation opening portion 5 of the outer panel 3 while maintaining the posture by swinging the first link portion 32 and the second link portion 33 constituting the parallel link of the link unit 30 in the biasing direction (R1 direction in FIG. 3). When the cam protrusion 88 rotates downward, the switch operation protrusion 87 of the cam member 72 comes into contact with the stop switch 91, and the stop switch 91 is in the ON state. Thus, the driving of the motor 71 is stopped, and the swinging of the link unit 30 is stopped. The cover member 31 of the link unit 30 is fitted into the opening portion 21 of the case 10 by the biasing force of the coil spring 69, and the operation opening portion 5 of the outer panel 3 of the door 2 is in the closed state of being closed by the cover member 31 (see FIGS. 11 and 12). In the closed state, the crank portion 56 of the cam rod 55 constituting the second link portion 33 of the link unit 30 comes into contact with the detection switch 95, and the detection switch 95 is in the ON state. Accordingly, the controller detects that the cover swing mechanism 20 is in the closed state.

As described above, according to the vehicle door opening and closing operation device 1 of the present embodiment, the cam follower portion 58 overlaps the cam member 72 in the front view, and the cam protrusion 88 of the cam member 72 that presses the cam follower portion 58 is disposed inside the outer shape of the cam member 72, so that the cover swing mechanism 20 can be made compact. Accordingly, the overall size of the vehicle door opening and closing operation device 1 can be reduced, and an installation space in the door 2 of the vehicle can be saved.

Moreover, the link unit 30 has a parallel link structure including the first link portion 32 and the second link portion 33, and the cover member 31 is moved between the closed position and the open position by the link unit 30 while maintaining the posture. Accordingly, in the open state in which the operation opening portion 5 is opened, for example, it is possible to eliminate protrusion caused by the posture of the cover member 31 being obliquely disposed. Accordingly, in the open state, the large operation space 7 can be secured in the back of the operation opening portion 5, and operability of the door opening and closing mechanism 100 by the user can be enhanced.

The first link portion 32 includes the pair of first link arms 41, the second link portion 33 includes the pair of second link arms 51, and the swing unit 70 is disposed between the pair of first link arms 41 and between the pair of second link arms 51. Accordingly, the cover swing mechanism 20 can be made more compact, and the vehicle door opening and closing operation device 1 can be further reduced in size.

Further, since the damper 63 that applies a load to the link unit 30 is provided, the biasing force of the coil spring 69 when the link unit 30 swings and the cover member 31 is moved is attenuated, and the cover member 31 can slowly returns to the closed position. Thus, marketability of the vehicle is improved.

The present invention is not limited to the above-described embodiments, and modifications, improvements, and the like can be made as appropriate. In addition, materials, shapes, dimensions, numbers, arrangement positions, and the like of the constituent elements in the above-described embodiment are optional and are not limited as long as the present invention can be achieved.

For example, in the embodiment, the link unit 30 employs the parallel link structure including the first link portion 32 and the second link portion 33, and thus the cover member 31 moves between the closed position and the open position while maintaining the posture, but the present invention is not limited thereto. The link unit may employ a link structure with one degree of freedom in which the first link portion 32 is not provided and the second link portion 33 and the cover member 31 are coupled so as not to be rotated, and thus the cover member 31 may move between the closed position and the open position by rotating with respect to the surface of the door 2.

According to an embodiment, as shown in the Figures, a vehicle door opening and closing operation device includes a cover swing mechanism 20 and a door opening and closing operation portion 100. The cover swing mechanism 20 has a cover member 31 that moves between a closed position where an operation opening portion 5 provided in a door 2 of a vehicle is closed and an open position where the operation opening portion 5 is opened. The door opening and closing operation portion 100 is disposed in the door 2 and configured to be operated by a user through the operation opening portion 5 to open and close the door 2. The cover swing mechanism 20 includes a swing link unit 30 and a swing unit 70. The swing link unit 30 is swingable and movably supports the cover member 31 between the closed position and the opening position. The swing unit 70 includes a cam member 72 configured to be rotated by a motor 71. The swing unit 70 presses an engagement portion (cam follower portion 58) of the link unit 30 by a protruding portion (cam protrusion 88) provided on the cam member 72 and swings the link unit 30 to move the cover member 31. At least a part of the engagement portion (cam follower portion 58) overlaps the cam member 72 in a front view.

In the vehicle door opening and closing operation device having the above configuration, since at least a part of the engaging portion overlaps with the cam member in the front view, the cover swing mechanism can be made compact. Accordingly, the overall size of the vehicle door opening and closing operation device can be reduced, and the installation space in the door of the vehicle can be saved.

According to an embodiment, the protruding portion (cam protrusion 88) is disposed inside an outer shape of the cam member 72.

In the vehicle door opening and closing operation device having the above configuration, since the protruding portion of the cam member for pressing the engagement portion is disposed inside the outer shape of the cam member, it is possible to make the cover swing mechanism more compact.

According to an embodiment, the link unit 30 has a parallel link structure including a first link portion 32 and a second link portion 33, and the cover member 31 is moved between the closed position and the open position by the link unit 30 in a state in which a posture is maintained.

In the vehicle door opening and closing operation device having the above configuration, the link unit moves the cover member between the closed position and the open position while maintaining the posture of the cover member. Accordingly, in the open state in which the operation opening portion is opened, for example, it is possible to eliminate protrusion caused by the posture of the cover member being obliquely disposed. Accordingly, in the open state, the large operation space can be secured in the back of the operation opening portion, and operability of the door opening and closing mechanism by the user can be enhanced.

According to an embodiment, the first link portion 32 and the second link portion 33 respectively include a pair of link arms 41 and a pair of link arms 51, and the swing unit 70 is disposed between the pair of link arms 41 and between the pair of link arms 51.

In the vehicle door opening and closing operation device having the above configuration, since the swing unit is disposed between the link arms, the cover swing mechanism can be made more impact, and the vehicle door opening and closing operation device can be further reduced in size.

According to an embodiment, the vehicle door opening and closing operation device further includes a damper 63 configured to apply a load to the link unit 30.

In the vehicle door opening and closing operation device having the above configuration, backlash of the link unit when the link unit swings and the cover member is moved is suppressed by the damper. Accordingly, the cover member can be smoothly moved.

What is claimed is:

1. A vehicle door opening and closing operation device comprising:

a cover swing mechanism having a cover member that moves between a closed position where an operation opening portion provided in a door of a vehicle is closed and an open position where the operation opening portion is opened; and a door opening and closing operation portion disposed in the door and configured to be operated by a user through the operation opening portion to open and close the door, wherein the cover swing mechanism includes:

a link unit that is swingable and movably supports the cover member between the closed position and the open position; and a swing unit that includes a cam member configured to be rotated by a motor, wherein the swing unit is configured to press an engagement portion of the link unit by a protruding portion provided on the cam member, and to swing the link unit to move the cover member, wherein at least a part of the engagement portion overlaps the cam member in a front view, wherein the cam member is rotatable about a rotation shaft along a front-rear direction, and wherein the cover member moves in the front-rear direction between the closed position and the open position.

* * * * *